Jan. 5, 1965 H. VISSERS 3,164,212
MACHINE FOR CULTIVATING THE SOIL
Filed Feb. 24, 1964
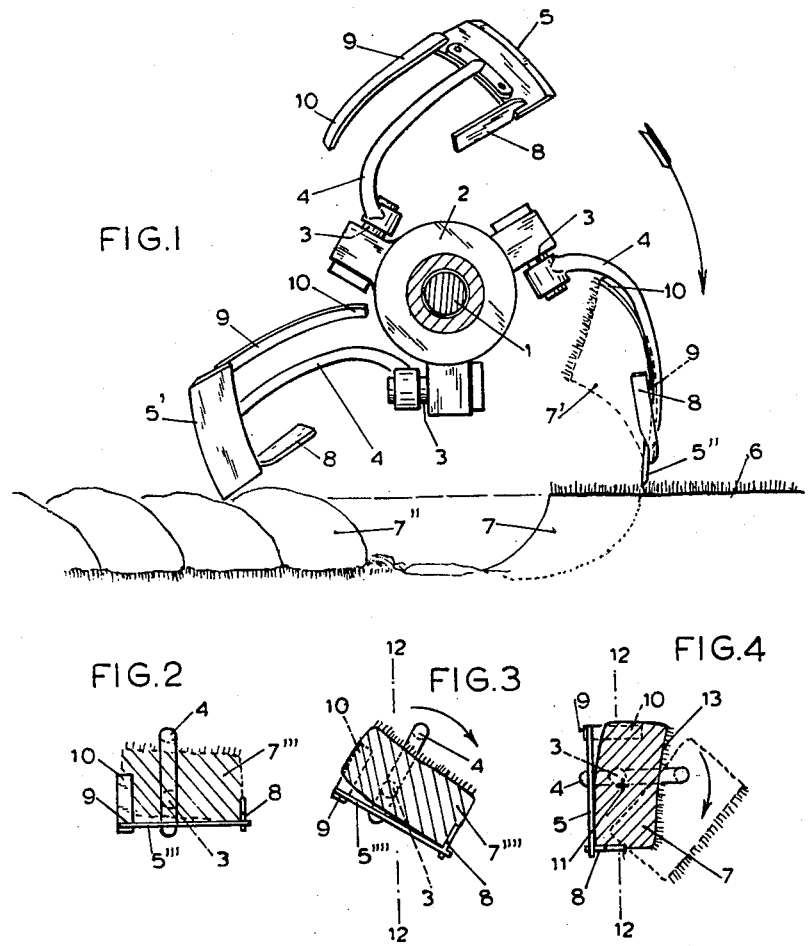
INVENTOR
HERBERT VISSERS
BY
ATTORNEYS United States Patent Office 3,164,212
Patented Jan. 5, 1965

3,164,212
MACHINE FOR CULTIVATING THE SOIL
Herbert Vissers, Nieuw Vennep, Netherlands, assignor to Landbouwwerktuigen- en Machinefabriek H. Vissers N.V., Nieuw Vennep, Netherlands, a Dutch manufacturing company
Filed Feb. 24, 1964, Ser. No. 346,677
Claims priority, application Netherlands Feb. 25, 1963
3 Claims. (Cl. 172—94)

This invention relates to a machine for cultivating, more particularly digging the soil, comprising a frame supported for movement over the ground surface, one or more hubs mounted for rotation on said frame, each hub carrying a plurality of digging blades, each blade secured on an arm rotatably supported on said hub, said blade performing a tilting movement upon a rotation imparted to said arm for depositing the soil cut raised by the blade. The known machines of this kind have the disadvantage that the moment at which the raised cut of soil slips off the blade is not exactly defined. The moment at which the raised cut of soil slips off the blade is defined by the friction between the cut of soil and the blade and so this moment depends on the nature of the soil and also on the condition of the soil. This condition can vary locally so that the various cuts of the soil are deposited out of line and irregularly spaced. This results in the dug field having an irregular appearance. Further when the cut of soil is deposited, one of the edges of the upper side of the cut will fall so as to remain at the surface of the field, so that on the digging in of green manure green spots remain visable in places. Then if the weather is favourable for vegetation, weeds will shoot up rather quickly. The above mentioned disadvantages are completely removed if according to the invention the active surface of the blade on the edge along which the raised out cut of soil is falling downwards, comprises an elongated low raised rim extending in the direction corresponding with the direction of said edge. Then the cut of soil will not slip off the blade, but will tilt there off. The movement at which this tilting occurs is defined by the position of the centre of gravity in relation to a vertical plane through the edge of the raised rim. So the moment of tilting is now independent of the friction between the cut of soil and the blade. The result is a completely regular appearance of the dug field whereas the cuts of soil are turned completely so that all overgrowth is dug in.

According to the invention the cutting portion of the blade is at least on the edge turned away from the raised rim extended in backward direction and the rear portion of the blade being in line with said edge is lying above the main plane of the blade. The results of this arrangement is that the centre of gravity of the cut of soil lying on the blade passes the vertical plane through the edge of the raised rim at an earlier moment. So the tilting of the cut of soil is initiated earlier.

According to the invention further the cutting portion of the blade on the edge turned away from the raised rim has been extended with a springlike strip, the rear end of which lies above the main plane of the blade. The result of this arrangement is not only that the moment of tilting is initiated earlier, but due to the characteristics of this springlike strip it can vibrate and so in the case of a special nature of the soil the coming off of the cut of soil from the blade can be promoted through the vibration of the strip.

The invention is to be elucidated further with reference to the drawing, which illustrates an embodiment of the machine according to the invention.

In the drawing:

FIG. 1 is a cross section of a digging machine according to the invention showing a set of digging blades;

FIG. 2 is an elevational view against the cutting edge of the spade after digging a cut of soil;

FIG. 3 is a view corresponding with the one of FIG. 2 after turning the spade over a small angle;

FIG. 4 is a view corresponding with the one of FIG. 2, the spade being in a position just before tilting of the cut of soil.

FIG. 1 shows schematically a set of spades of a rotating digging machine. A stationary shaft 1 is mounted in the frame (not shown) of a digging machine which for example is connected to a tractor. In a casing 2 rotatively supported on the shaft 1 arms 4 are secured to rotatable stub axles 3. Each of these arms 4 carries at its free end a cutting portion 5 of a digging blade. During the rotation of the casing 2 with these spades around the shaft 1, each stub axle 3 and so the arm 4, is turned, with its cutting blade around the centre line of the stub axle 3 over a certain angle into the position 5', after the passing of the cutting edge of the blade 5 its lowermost position. Thereupon the arm with the cutting blade is turned backwards into the position 5" in which the cutting edge of the blade is substantially parallel to the shaft 1. The movement of the stub axle 3 is performed by means of a groove (not shown), which cooperates with a guiding element mounted on the stub axle 3.

The cutting blade has a raised rim 8, the aim of which will be described in the following. The same is true for the strip 9 lying at the other side of the cutting blade. The rear end 10 of the strip 9 being bent upward relative to the main plane of the blade.

When the digging machine is working the cutting edge of the blade 5 will be pressed into the soil from the position 5", with the result that a cut 7 is dug. Then this cut 7 is lying on the blade 5. In FIG. 1 is indicated with a dotted line how the cut 7 lies in relation to the blade immediately after the cut is made but with the blade withdrawn from the soil to clearly show the cut at 7'.

FIG. 2 shows how the cut 7 is lying in the position 7'''' on the blade which is in the position 5''' when the cutting edge has just passed the lowermost point of its path. Upon the further movement of the blade this blade 5 describes a turning movement around the axis of the stub axle 3 as is indicated in FIG. 3. Here the cutting blade has the position 5'''' and the cut of soil is brought in the position 7'''''. Due to the raised rim 8 the cut 7''''' remains completely fixed on the blade. The rear part of the cut 7 is supported by the strip 9. On the further rotating movement at least the position according to FIG. 4 is reached, in which position the centre of gravity 11 of the cut of soil is just lying in the vertical plane 12—12 through the outer edge of the raised rim 8. On a somewhat further turning of the blade the cut of soil 7 will tilt around the raised rim 8 and will fall with the growth on the upper side 13 turned downward in the dug furrow. The moment at which the cut of soil commences to tilt depends exclusively on the position of the centre of gravity 11 in relation to the vertical plane 12—12.

Due to the bent rear portion 10 of the strip 9 the tilting of the cut of soil will occur somewhat earlier than if the strip 9 were to lie in the main plane of the blade.

In the case that the raised rim 8 would not have been provided as is the fact in the known digging machines, the cut of soil 7 would have already slipped off the blade in an intermediate position. The moment at which the cut of soil slips off the blade is then completely ruled by the friction between the cut of soil and the spade. These frictions however depend on several conditions such as the structure and the percentage of moisture of the soil, so that the several successively dug cuts of soil with conventional machines are not aligned exactly in the direction of movement of the machine, nor are they equally spaced.

In a special embodiment the strip 9 can be resilient. Then the strip can be brought easily in vibration so that the dropping off of the cut of soil from the spade is promoted.

What I claim is:

1. In a machine for cultivating or digging soil of the type including a frame supported for movement over the ground surface, at least one hub mounted for rotation on said frame, each hub carrying at least one arm to turn with the hub in a digging plane, said arms being supported on said hub to rotate with respect thereto as well as about the axis of the hub, said arms each terminating in a digging blade, and means for turning each arm to tilt its blade with respect to the digging plane as the arm rotates with the hub so as to deposit a soil cut raised by the blade, the improvements comprising a cutting edge on each blade generally perpendicular to the digging plane as the blade enters the soil, each blade also having a pair of side edges formed at angles to the cutting edge and extending rearwardly thereof with respect to the movement of the blade during digging, and a rim extension on and prolonging rearwardly that side edge of each blade which lowers during tilting of the blade, said rim extension having a portion projecting toward said hub as the blade enters the soil whereby to support cuts of soil for a predetermined portion of the tilting movement of the blade.

2. In a cultivating machine the improvements according to claim 1 wherein a second rearward extension is provided on each blade along the opposite side edge, said second extension having a rear portion also projecting toward said hub when the blade enters the soil.

3. In a digging machine the improvements according to claim 2 wherein said second extension comprises a strip of spring material.

No references cited.

T. GRAHAM CRAVER, *Primary Examiner*.